United States Patent [19]

Gaul et al.

[11] Patent Number: 4,668,265
[45] Date of Patent: May 26, 1987

[54] CORROSION RESISTANT COBALT-BASE ALLOY AND METHOD OF MAKING FIBERS

[75] Inventors: David J. Gaul; Robert E. Spencer, both of Newark, Ohio

[73] Assignee: Owens-Corning Fiberglas Corporation, Toledo, Ohio

[21] Appl. No.: 745,990

[22] Filed: Jun. 18, 1985

[51] Int. Cl.$^4$ .................................... C03B 39/04
[52] U.S. Cl. .................................... 65/8; 65/15; 65/374.12; 420/436; 420/588
[58] Field of Search .................. 420/436, 437–440, 420/588, 586; 148/408, 419, 425, 442; 65/8, 15, 374.12

[56] References Cited

U.S. PATENT DOCUMENTS

| | | | |
|---|---|---|---|
| 3,244,506 | 4/1966 | Reen | 420/436 |
| 3,366,478 | 1/1968 | Wheaton | 420/436 |
| 3,549,356 | 12/1970 | Sims et al. | 420/440 |
| 3,933,484 | 1/1976 | Costin | 420/588 |
| 3,960,552 | 6/1976 | Woulds | 420/438 |
| 3,980,473 | 9/1976 | Costin | 420/588 |
| 3,984,240 | 10/1976 | Costin | 420/588 |
| 4,353,742 | 10/1982 | Crook | 420/586 |
| 4,497,771 | 2/1985 | Spencer et al. | 420/586 |

FOREIGN PATENT DOCUMENTS

| | | |
|---|---|---|
| 901647 | 5/1985 | Belgium . |
| 59-179752 | 10/1984 | Japan . |
| 58-143303 | 2/1985 | Japan . |
| 60-52545 | 3/1985 | Japan . |
| 60-59039 | 4/1985 | Japan . |
| 59-79192 | 11/1985 | Japan . |
| 59-79193 | 11/1985 | Japan . |
| 59-119265 | 12/1985 | Japan . |
| 59-119266 | 12/1985 | Japan . |
| 59-114089 | 12/1985 | Japan . |
| 59-131621 | 1/1986 | Japan . |
| 59-120529 | 1/1986 | Japan . |
| 59-120528 | 1/1986 | Japan . |
| 59-121520 | 1/1986 | Japan . |
| 59-121521 | 1/1986 | Japan . |
| 59-122748 | 1/1986 | Japan . |

OTHER PUBLICATIONS

"Structural Stability of MAR–M 509, A Cobalt–Base Super Alloy", by J. M. Drapier et al., appearing in *Cobalt* 41, Dec. 1968, p. 199.

"Guide to Selection of Super Alloys", of *Metal Progress*—Mid-June 1980, vol. 118, No. 1, p. 3.

Metals Handbook–Ninth Edition, American Society of Metals, (1980), vol. 3, p. 271.

*Primary Examiner*—R. Dean
*Attorney, Agent, or Firm*—Ronald C. Hudgens; Robert F. Rywalski; John C. Smith, Jr.

[57] ABSTRACT

A cobalt-base alloy having a high tantalum and zirconium content and a low silicon content has superior strength and improved resistance to corrosion by molten glass. The alloy is highly suited for use in spinners for spinning molten mineral material, such as glass, into fibers.

9 Claims, 3 Drawing Figures

CORROSION RESISTANT COBALT-BASE ALLOY AND METHOD OF MAKING FIBERS

BACKGROUND OF THE INVENTION

This invention relates to improved cobalt-base alloys particularly suitable for high-temperature molten glass environments.

In one of its more specific aspects, the invention relates to articles manufactured from the alloys, particularly articles made by casting.

In certain industrial applications there is a need for alloys which possess high rupture strength and high oxidation resistance at high temperatures. Among such applications are those involved, for example, in the glass fiber industry, where filaments are produced by passing a molten mineral material, for example, glass, through the foraminous walls of a chamber adapted for rotation at high speeds, the chamber being known as a spinner, the filaments being emitted through fiberizing orifices of the wall due to the centrifugal action to which the molten material is subjected upon rotation of the spinner. Such spinners are typically operated when spinning glass fibers at temperatures of about 2050° F. and rotation speeds of about 2050 RPM. It is advantageous, from a production cost standpoint, for the rotation speed to be as high as possible to increase the rate at which filaments are emitted through the fiberizing orifices. However, higher spinner rotational speeds result in a reduction in spinner life due to the limited strength and corrosion resistance of the prior art alloys used in spinners. Also, cost savings are realized by fiberizing lower cost batch formulations such as higher viscosity wool glass, but prior art alloys have not had the necessary mechanical strength to fiberize at the higher temperatures required for higher viscosity wool glass. The stress rupture properties of prior art alloys fall off rapidly above 2100° F.

The best materials known, prior to the present invention, for use in such applications are those defined and claimed in U.S. Pat. No. 3,933,484 issued Jan. 20, 1976 and U.S. Pat. No. 4,497,771 issued Feb. 5, 1985, the alloy composition of U.S. Pat. No. 4,497,771 being substantially the same as that of U.S. Pat. No. 3,933,484 except that the alloy composition of U.S. Pat. No. 4,497,771 has a lower tantalum content.

The alloy compositions of the present invention have substantially improved strength and corrosion resistance compared with the alloy compositions disclosed in U.S. Pat. Nos. 3,933,484 and 4,497,771.

STATEMENT OF THE INVENTION

Accordingly, an object of this invention is to provide a cobalt-base alloy having superior strength and corrosion resistance, an alloy which can be vacuum investment cast and which is particularly resistant to corrosion by molten glass.

According to this invention there is provided a composition of matter possessing the following approximate composition, the various components of this composition being expressed herein on a weight percent basis:

| Element | Approximate Composition, Weight % |
| --- | --- |
| Chromium | About 27.0 to less than about 34 |
| Nickel | About 5 to about 15 |
| Wolfram | About 5 to about 10 |
| Tantalum | About 1.5 to about 4 |

-continued

| Element | Approximate Composition, Weight % |
| --- | --- |
| Zirconium | About 0.01 to about 0.5 |
| Silicon | About 0.01 to about 0.2 |
| Carbon | About 0.4 to about 0.7 |
| Boron | About 0.005 to about 0.5 |
| Cobalt | Balance |

In the above composition, the weight ratio of wolfram to tantalum will be within the range of from about 1.2 to about 6.6, the weight ratio of zirconium to boron will be within the range of from about 0.02 to about 100.

The preferred composition of this invention will be approximately as follows, on a weight percent basis:

| Element | Approximate Composition, Weight % |
| --- | --- |
| Chromium | About 32.0 to about 33.0 |
| Nickel | About 7.3 to about 8.7 |
| Wolfram | About 6.3 to about 7.3 |
| Tantalum | About 3.2 to about 3.8 |
| Zirconium | About 0.35 to about 0.45 |
| Silicon | Present but about 0.150 max. |
| Carbon | About 0.50 to about 0.60 |
| Boron | About 0.008 to about 0.012 |
| Cobalt | Balance |

In the preferred composition, the weight ratio of wolfram to tantalum will be within the range of from about 1.6 to about 2.3, and the weight ratio of zirconium to boron will be within the range of from about 29 to about 56.

The best mode of practicing the invention is represented by the following approximate composition on a weight percent basis:

| Element | Approximate Composition, Weight % |
| --- | --- |
| Chromium | About 32.5 |
| Nickel | About 8.0 |
| Wolfram | About 6.8 |
| Tantalum | About 3.5 |
| Zirconium | About 0.40 |
| Silicon | About 0.10 |
| Carbon | About 0.55 |
| Boron | About 0.01 |
| Cobalt | Balance |

In the above composition, the weight ratio of wolfram to tantalum will be about 1.9 and the weight ratio of zirconium to boron will be 40.

The above compositions are not meant to preclude the presence of impurities which are inherently contained in the principal components previously set forth. However, these impurities should be limited to about 0.005 weight percent sulfur, 0.005 weight percent phosphorous, 0.20 weight percent aluminum, 0.20 weight percent titanium, 0.05 weight percent manganese, 0.10 weight percent molybdenum, and 1.00 weight percent iron. Also, the nitrogen and oxygen gas levels in the compositions should be limited to a maximum of 50 ppm and 20 ppm, respectively.

Comparing the alloy compositions disclosed and claimed in U.S. Pat. Nos. 3,933,484 and 4,497,771, the alloy compositions of the present invention have a higher tantalum content, which results in the formation of more MC carbides (where M are suitable carbide formers, as for example zirconium and tantalum) enhancing the strength of the alloys. In addition, the zirconium content is maintained high to also form more MC carbides which partition to the grain boundaries reducing grain boundary sliding and thereby enhance the strength of the alloys. Stronger alloy castings are produced using vacuum-casting techniques rather than air-casting techniques provided that the silicon content of the alloys is maintained low. Accordingly, the silicon content of the alloys of the present invention is relatively low to permit the formation of higher strength castings by vacuum casting techniques.

BRIEF DESCRIPTION OF THE DRAWINGS

The features and advantages of the present invention will become more clearly appreciated from the following description taken in conjunction with the accompanying drawings in which.

DETAILED DESCRIPTION OF THE INVENTION

Figure 1:
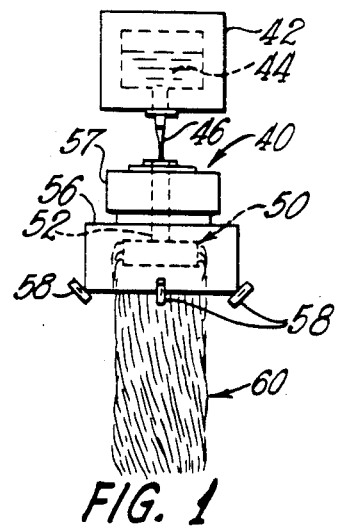
FIG. 1 is a semi-schematic, front elevational view of a rotary fiber-forming system for producing glass wool.

The compositions of this invention can be prepared by vacuum-melting and vacuum-casting according to recognized melt procedures for cobalt-base alloys, sometimes known as superalloys.

In the preferred method of producing the alloys, the original melt formed in the crucible will consist principally of chromium and cobalt. Thereafter, the remainder of the elements required can be introduced into the original melt in any order when the melt temperature is within the range from about 2700° F. to about 2800° F. As an alternate, however, all components of the composition can be introduced into the crucible with the cobalt and chromium. Inasmuch as zirconium and boron are contained in the composition in minimal amounts and certain weight ratios have been indicated desirable, it is preferred that the zirconium, boron, wolfram and tantalum be introduced into the melt immediately prior to pouring in order to protect either the oxidation of these latter materials or their loss from the crucible. After the addition of these latter materials, the melt is heated to a temperature within the range of from about 2800° F. to about 3025° F. to produce a uniform composition. The temperature of the melt is reduced to 2600° F. to 2750° F. and poured into a heated investment mold. The mold temperature is between 1600° F. and 1900° F. with 1800° F. being optimum. The investment mold is produced by the lost wax process. A wax pattern of the casting is invested in a series of ceramic slurries which are cured. The wax is removed in a steam autoclave and the finished mold is heated in a suitable high-temperature furnace. Preferably, the resulting cast alloy will be heated at 2300° F. for 4 hours, air-cooled, heated at 1700° F. for 16 hours and air-cooled prior to further operations.

Castings made from the alloys of the present invention are produced by the vacuum investment cast process which allows the introduction of higher levels of reactive elements such as zirconium and tantalum than can be used with the prior art alloys of U.S. Pat. No. 3,933,484. The vacuum investment cast process is described in *The Superalloys* by Simms and Hagel, John Wiley & Sons, Inc., 1972, pages 383-391 and 403-425. Castings of the prior art alloys are produced via an air melt process requiring the presence of a high level of silicon in the alloys to increase the fluidity of the melt. Fluidity is not a problem with the vacuum investment cast process, and therefore the silicon content in the alloys of the present invention are kept at a low level. Furthermore, the use of high silicon content alloys in vacuum investment cast processes should be avoided as castings formed by this process are susceptible to a defect known as shrinkage porosity. The presence of high amounts of silicon in the alloys increases the freezing range of the alloys giving rise to casting integrity problems. One of the benefits of using the vacuum investment cast process is the ability to produce near net shape castings. The alloys of the present invention are ideal for vacuum investment cast processes compared with the prior art alloys containing a high silicon content.

Even if a good quality casting of a prior art alloy of U.S. Pat. No. 3,933,484 is made by the vacuum investment cast process, the casting will not possess the mechanical performance of the alloys of the present invention. For example, a casting consisting of a prior art alloy of U.S. Pat. No. 3,933,484 may have a rupture life on only 31 hours compared with the same alloy which has been subjected to a vacuum melting process which may have a rupture life of 93 hours. However, even though the rupture life is increased by the vacuum melting process, the creep rate is too high for dimensional stability. The creep rate may increase from $6.8 \times 10^{-4}$ in./in./hr. to $3.7 \times 10^{-3}$ in./in./hr. at 2100° F. and 3000 psi. Thus, the mechanical performance of the prior art alloys even when subjected to a vacuum investment cast process is not as good as the alloys of the present invention when subjected to the vacuum investment cast process.

The mechanical performance of the alloys of the present invention may be further enhanced by subjecting these alloys to a heat treatment which solutions the cast carbide structure and then precipitates a high fraction of MC carbides and produces a fine dispersion of $M_{23}C_6$ carbides. (An approximate composition of the carbide is $Cr_{21}W_2C_6$.) The MC carbides and the fine dispersion of $M_{23}C_6$ carbides substantially increases the rupture life of the alloys. For example, an alloy of the present invention, simply subjected to the vacuum investment cast process, was found to have a life of 110 hours. The same alloy after being subjected to the heat treatment had a life of 163.3 hours.

One cannot solution and age the prior art alloys of U.S. Pat. No. 3,933,484 in view of its high silicon content which is stated above increases the freezing range. This, in effect, lowers the incipient melting point such that any temperature necessary to solution the carbides is above the incipient melting point. Silicon partitions to the $M_{23}C_6$ in such a fashion that it effects the composition and morphology. When high silicon content alloys are heat-treated at solution temperature, the $M_{23}C_6$ carbides are rapidly ripened giving rise to a strength reduction. For example, if an alloy of the prior art is subjected to a solution heat treatment, the rupture life of the alloy drops from 31 hours to 8 hours at 2100° F. and 3000 psi.

As previously indicated, alloys of this invention are particularly suited for use in manufacture of spinners. A combination of stress-rupture and metal corrosion by molten glass limit the service life of spinners in operation.

Figure 2:
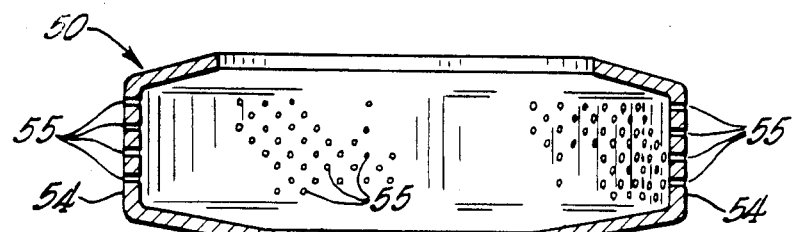
FIG. 2 is an enlarged cross-sectional view of the spinner shown in FIG. 1.

Referring to FIGS. 1 and 2, in which like numerals represent like parts, there is shown a rotary or centrifugal fiber-forming system including a rotor or spinner 50 fabricated in its entirety of the alloy of this invention.

As shown in FIG. 1, rotary or centrifugal fiber-forming system 40 is comprised of a flow means or channel 42 having a body of molten inorganic material 43, such as glass, therein. A stream of molten glass 46 is supplied to the rotor or spinner 50 from channel 42, as is known in the art.

Spinner 50 (shown in detail in FIG. 2), which is adapted to be rotated at high speeds, is comprised of a quill 52 and a circumferential stream-defining or working wall 54 having a plurality of orifices or apertures 55 therethrough to supply a plurality of pre-filament or primary streams of molten and inorganic material, such as glass, to be fiberized. After forming the body of the rotor by any suitable process, such as casting, thousands of holes are formed in the circumferential wall, for example, by electron beam drilling.

In conjunction with rotor 50, a shroud 56 and circumferential blower or fluid attenuation means 57 are adapted to fluidically assist in the attenuation of the streams of molten material into fibers or filaments 60. A binder material or coating may be applied to the fibers 60 by means of binder applicators 58 as is known in the art. The fibers then may be collected as a pack or mat to produce "wool" type glass fiber insulation.

The following example demonstrates the improved properties of the alloys of the present invention as compared with those alloys defined in U.S. Pat. No. 3,933,484. Tests were conducted to compare the relative strengths and corrosion resistances of an alloy of the present invention with a prior art alloy of U.S. Pat. No. 3,933,484.

The alloy of the present invention had the following composition on a weight percent basis:

| Chromium | About 32.5 | Silicon | About 0.10 |
| Nickel | About 8.0 | Carbon | About 0.55 |
| Wolfram | About 6.8 | Boron | About 0.01 |
| Tantalum | About 3.5 | Cobalt | Balance |
| Zirconium | About 0.40 | | |

The prior art alloy contained the following composition on a weight percent basis:

| Chromium | About 31.2 | Silicon | About 0.63 |
| Nickel | About 11.7 | Carbon | About 0.59 |
| Wolfram | About 7.4 | Boron | About 0.038 |
| Tantalum | About 1.8 | Iron | About 1.5 max. |
| Zirconium | About 0.025 | Cobalt | Balance |

The alloy of the present invention was heat-treated at 2300° F. for 4 hours and then at 1700° F. for 16 hours. The prior art alloy was heat-treated at 2000° F. for 3 hours.

The relative strengths of the alloys were determined by a standard stress-rupture test (American National Standard/ASTM E-139-70 (reapproved 1978)). Average stress rupture performance under four different test conditions demonstrate the markedly improved average life of the alloy of the present invention compared with the prior art alloy:

| | Test Conditions | | Average Life (Hours) | Average Creep Rate (in./in./hr.) |
|---|---|---|---|---|
| | Temp. (°F.) | Pressure (psi) | | |
| Alloy of present invention | 2100° | 3000 | 163 | $1.1 \times 10^{-4}$ |
| Prior art alloy | 2100° | 3000 | 31 | $6.8 \times 10^{-4}$ |
| Alloy of present invention | 2050° | 5000 | 70.6 | — |
| Prior art alloy | 2050° | 5000 | 17.5 | — |
| Alloy of present invention | 2050° | 4000 | 259.3 | $0.42 \times 10^{-4}$ |
| Prior art alloy | 2050° | 4000 | 36.5 | $1.1 \times 10^{-3}$ |
| Alloy of present invention | 2100° | 6000 | 8.9 | — |
| Prior art alloy | 2100° | 6000 | 2.1 | — |

Figure 3:
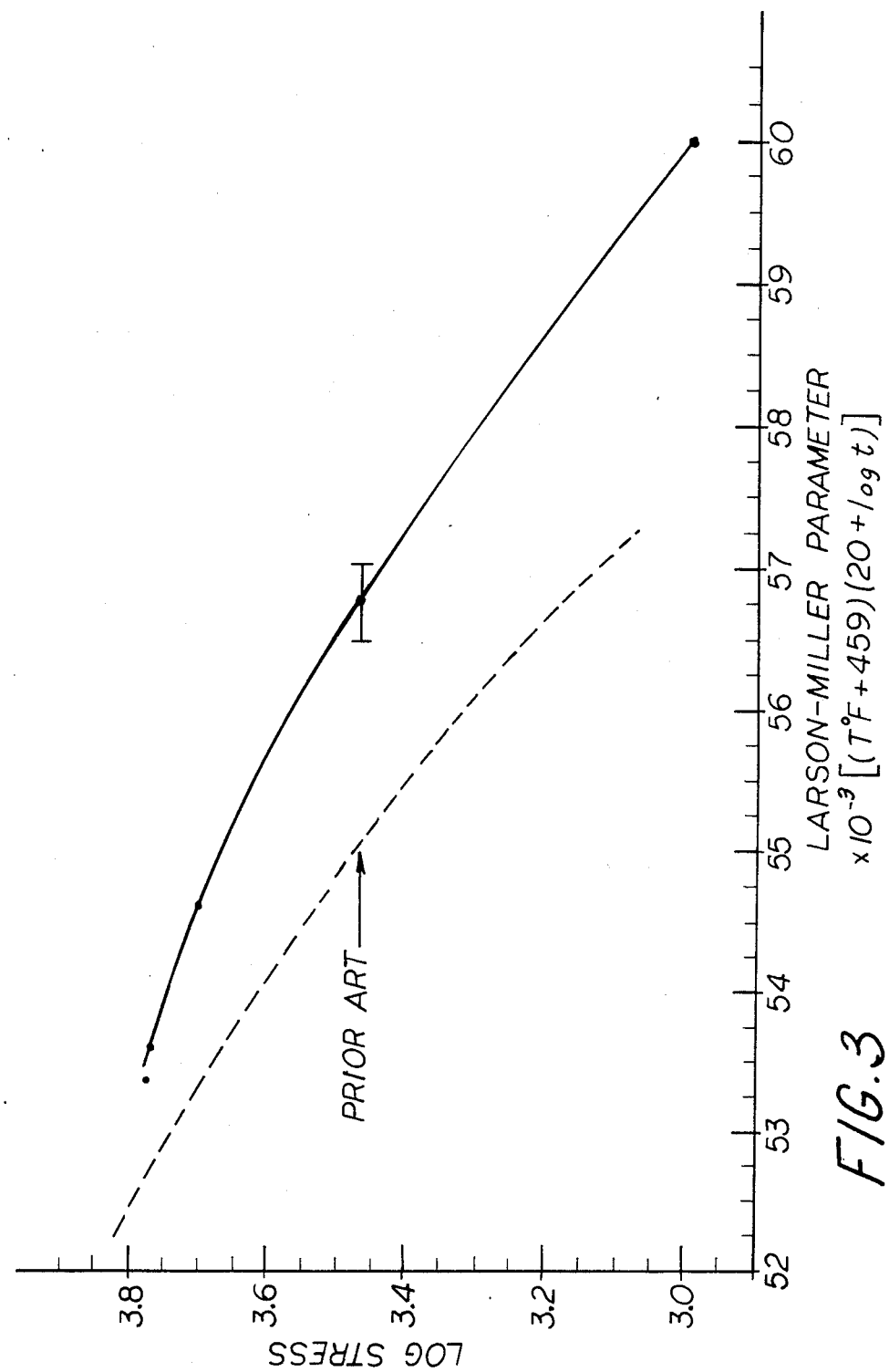
FIG. 3 is a graph showing the improved stress-rupture performance of an alloy of the present invention compared to the prior art.

The substantially improved stress rupture performance of the alloy of the present invention as compared with the prior art alloy is illustrated in the graph of FIG. 3 wherein the log of the stress is plotted against the Larson-Miller parameter. For example, the data indicate that spinners composed of the alloys of the present invention can be operated at significantly higher temperatures than prior art alloys under identical stress conditions and/or operated at higher stresses at identical temperature conditions.

The relative corrosion rates of the alloys were determined by a spinner coupon test. In this test holes are countersunk into the top inside of the spinner face of a spinner of the type described above which is cast from one of the two alloys. Samples or coupons composed of the other alloy are press-fit into the holes after which the spinner blanks are drilled. Thus, the samples or coupons become an integral part of the spinner wall, and a direct comparison can be made between the alloy of the present invention and the prior art alloy under identical process conditions.

The compositions of the prior art alloy and the alloy of the present invention were the same as in the above-described stress-rupture tests. The following test data demonstrates that under a variety of test conditions the average corrosion rate of the alloy of the present invention is at least equal to the average corrosion rate of the prior art alloy.

| Alloy | Average Corrosion Rate (mil/200 hr.) |
|---|---|
| Alloy of the present invention | 14.1 |
| Prior art alloy | 14.3 |
| Alloy of the present invention | 9.5 |
| Prior art alloy | 9.4 |
| Alloy of the present invention | 10.1 |
| Prior art alloy | 10.1 |

The above comparative stress rupture and corrosion data demonstrate that the alloys of the present invention have a markedly improved average life without any decline in the average corrosion rate compared with the prior art alloys.

It will be evident from the foregoing that various modifications can be made to this invention; such, however, are within the scope of the invention.

We claim:

1. As a composition of matter a glass corrosion resistant, high strength alloy consisting essentially of the following elements in the approximate amounts, expressed in weight percent:

| Element | Approximate Composition, Weight % |
| --- | --- |
| Chromium | About 32.0 to about 33.0 |
| Nickel | About 7.3 to about 8.7 |
| Wolfram | About 6.3 to about 7.3 |
| Tantalum | About 3.2 to about 3.8 |
| Zirconium | About 0.35 to about 0.45 |
| Silicon | Present but about 0.150 max. |
| Carbon | About 0.50 to about 0.60 |
| Boron | About 0.008 to about 0.012 |
| Cobalt | Balance | the weight ratio of wolfram to tantalum being within the range of from about 1.6 to about 2.3 and the weight ratio of zirconium to boron being within the range of from about 29 to about 56.

2. The composition of claim 1 in which said elements are contained in the following approximate amounts expressed in weight percent:

| Element | Approximate Composition, Weight % |
| --- | --- |
| Chromium | About 32.5 |
| Nickel | About 8.0 |
| Wolfram | About 6.8 |
| Tantalum | About 3.5 |
| Zirconium | About 0.40 |
| Silicon | About 0.10 |
| Carbon | About 0.55 |
| Boron | About 0.01 |
| Cobalt | Balance | the weight ratio of wolfram to tantalum being about 1.9 and the weight ratio of zirconium to boron being about 40.

3. The composition of claim 1 having a life of at least about 163 hours at stress rupture conditions of about 3000 psi and 2100° F.

4. An article of manufacture produced by casting the composition of matter defined by claim 1.

5. An article of manufacture produced by casting the composition of matter defined by claim 2.

6. A spinner comprised of the composition of claim 1, said spinner being comprised of foraminous walls and adapted for rotation.

7. A spinner comprised of the composition of claim 2, said spinner being comprised of foraminous walls and adapted for rotation.

8. In a method of making mineral fibers comprising passing molten mineral material through a foraminous wall of a metal alloy to form such fibers, the improvement wherein the alloy of the foraminous wall is the composition of matter of claim 1.

9. In a method of making mineral fibers comprising passing molten mineral material through a foraminous wall of a metal alloy to form such fibers, the improvement wherein the alloy of the foraminous wall is the composition of matter of claim 2.

* * * * *